(12) United States Patent
Eguchi

(10) Patent No.: US 11,408,220 B2
(45) Date of Patent: Aug. 9, 2022

(54) SWITCH DEVICE FOR ESTABLISHING AN OPERATIVE CONNECTION IN BETWEEN TWO GEAR ELEMENTS

(71) Applicant: BROSE FAHRZEUGTEILE GMBH & CO. KOMMANDITGESELLSCHAFT, BAMBERG, Bamberg (DE)

(72) Inventor: Takafumi Eguchi, Aichi (JP)

(73) Assignee: BROSE FAHRZEUGTEILE GMBH & CO. KOMMANDITGESELLSCHAFT, BAMBERG, Bamberg (DE)

( * ) Notice: Subject to any disclaimer, the term of this patent is extended or adjusted under 35 U.S.C. 154(b) by 875 days.

(21) Appl. No.: 16/220,039

(22) Filed: Dec. 14, 2018

(65) Prior Publication Data

US 2019/0186191 A1  Jun. 20, 2019

(30) Foreign Application Priority Data

Dec. 15, 2017  (DE) .......................... 10201730151.8

(51) Int. Cl.
*E05F 15/00* (2015.01)
*E05F 15/614* (2015.01)
(Continued)

(52) U.S. Cl.
CPC .............. *E05F 15/614* (2015.01); *E05F 3/16* (2013.01); *E05F 5/025* (2013.01); *E05F 15/627* (2015.01);
(Continued)

(58) Field of Classification Search
CPC ........... E05F 15/614; E05F 3/16; E05F 5/025; E05F 15/627; E05F 15/63; E05F 5/00;
(Continued)

(56) References Cited

U.S. PATENT DOCUMENTS 4,121,382 A  10/1978  Dietrich et al.
6,460,295 B1 *  10/2002  Johnson ................ E05F 15/603
                                                49/360
(Continued)

FOREIGN PATENT DOCUMENTS

CN   1166419 A   12/1997
CN   105189165 A   12/2015
(Continued)

OTHER PUBLICATIONS

Chinese Office Action for Application No. CN201811542481.3, dated Apr. 23, 2020, 6 pages.
Chinese Office Action for Application No. CN201811542481.3, dated Nov. 19, 2020, 11 pages.

*Primary Examiner* — Chi Q Nguyen
(74) *Attorney, Agent, or Firm* — Brooks Kushman P.C.

(57) ABSTRACT

A control unit for establishing a functional connection between two gearing components comprises at least one control element, which can be moved in order to switch the control unit between different switching states, wherein the at least one control element is configured to provide a retaining force between the gearing components in a first switching state, and to allow movement of the gearing components in relation to one another in a second switching state. An actuator is used to move the at least one control element. A control mechanism controls the actuator. It is provided thereby that the control mechanism is configured to activate the actuator to switch the control unit from the first switching state to the second switching state, in order to move the at least one control element to reduce the retaining force (FH) based on a predetermined delay function (VF).

18 Claims, 8 Drawing Sheets

(51) Int. Cl.
*E05F 3/16* (2006.01)
*E05F 5/02* (2006.01)
*F16H 1/46* (2006.01)
*E05F 15/63* (2015.01)
*E05F 15/627* (2015.01)
*F16H 19/06* (2006.01)

(52) U.S. Cl.
CPC ........... *E05F 15/63* (2015.01); *E05Y 2201/26* (2013.01); *E05Y 2201/266* (2013.01); *E05Y 2201/408* (2013.01); *E05Y 2201/434* (2013.01); *E05Y 2201/70* (2013.01); *E05Y 2201/702* (2013.01); *E05Y 2201/72* (2013.01); *E05Y 2201/726* (2013.01); *E05Y 2400/32* (2013.01); *E05Y 2400/45* (2013.01); *E05Y 2900/531* (2013.01); *F16H 1/46* (2013.01); *F16H 19/0628* (2020.05)

(58) Field of Classification Search
CPC ........... E05Y 2201/702; E05Y 2400/32; E05Y 2201/26; E05Y 2201/726; E05Y 2201/72; E05Y 2201/70; E05Y 2400/45; E05Y 2201/266; E05Y 2201/408; E05Y 2900/531; E05Y 2201/434; F16H 19/0628; F16H 1/46
USPC ......... 49/334, 335, 336, 337, 340, 341, 349, 49/350
See application file for complete search history.

(56) References Cited

U.S. PATENT DOCUMENTS

| | | | | |
|---|---|---|---|---|
| 9,859,770 | B2* | 1/2018 | Simofi-Ilyes | H02K 7/10 |
| 9,987,987 | B2* | 6/2018 | van Stiphout | B60R 1/06 |
| 10,215,278 | B1* | 2/2019 | Tuchscherer | F16H 35/18 |
| 10,940,801 | B1* | 3/2021 | Harris | B60R 1/074 |
| 2003/0218812 | A1* | 11/2003 | Foote | B60R 1/074 |
| | | | | 359/874 |
| 2005/0046290 | A1* | 3/2005 | Baukholt | H02K 7/116 |
| | | | | 310/75 R |
| 2006/0201768 | A1* | 9/2006 | Hori | F02N 11/103 |
| | | | | 192/84.1 |
| 2011/0094160 | A1* | 4/2011 | Houser | E05F 15/63 |
| | | | | 49/31 |
| 2015/0184443 | A1 | 7/2015 | Sakai et al. | |
| 2017/0232900 | A1* | 8/2017 | Fuchs | F16H 1/203 |
| | | | | 359/841 |
| 2017/0232901 | A1* | 8/2017 | Schadler | B60R 1/076 |
| | | | | 359/841 |
| 2018/0216384 | A1 | 8/2018 | Reitdijk | |

FOREIGN PATENT DOCUMENTS

| | | | | |
|---|---|---|---|---|
| DE | 10313440 | A1 | 10/2004 | |
| DE | 202006010697 | U1 | 11/2007 | |
| DE | 202012007455 | U1 | 11/2013 | |
| DE | 102016223667 | * | 11/2016 | ............ E05F 15/627 |
| DE | 102015215627 | A1 | 2/2017 | |
| DE | 102015215630 | A1 | 2/2017 | |
| DE | 102018205138 | * | 10/2019 | ............ E05F 15/63 |
| WO | 2016164023 | A1 | 10/2016 | |

* cited by examiner

SWITCH DEVICE FOR ESTABLISHING AN OPERATIVE CONNECTION IN BETWEEN TWO GEAR ELEMENTS

CROSS-REFERENCE TO RELATED APPLICATIONS

This application claims priority to German Patent Application No. DE 10 2017 130 151.8 filed on Dec. 15, 2017, the disclosure of which is incorporated in its entirety by reference herein.

TECHNICAL FIELD

The disclosure relates to a control unit for establishing a functional connection between two gearing components.

BACKGROUND

A control unit can be used in particular on a device for an electric motor and/or manual changing or maintaining of the position of a first vehicle part in relation to a second vehicle part. Such a device can serve, for example, as a door drive for controlling a vehicle side door or other hatch on a vehicle, e.g. a rear hatch.

SUMMARY

One aspect of the present disclosure is to create a control unit for establishing a functional connection between two gearing components, with which an advantageous transition between switching states can be obtained.

Accordingly, the control mechanism is configured to activate the actuator for controlling the at least one control element, in order to switch the control unit from the first switching state to the second switching state, to reduce the retaining force on the basis of a predetermined delay function.

The control mechanism controls the actuator—in contrast to an abrupt control—such that a retaining force is obtained in the transition between the first switching state and the second switching state, in accordance with a predetermined delay function. As a result, a continuously decreasing retaining force is applied, such that the transition from the first switching state to the second switching state is delayed.

Because the switching between the first switching state and the second switching state is slowed down, an abrupt transition from the first switching state to the second switching state is avoided. When the control unit is used with a device for changing or maintaining the position of a vehicle door, an abrupt release of the vehicle door from a retained position can be avoided, such that an abrupt return movement of the vehicle door is prevented. Instead, the vehicle door is braked in a defined manner at the start of the movement of the vehicle door due to the delayed transition between the switching sates, such that the movement of the vehicle door takes place in a damped manner, in particular at the start of a control movement.

The delay function can be configured such that, in particular when the control unit transitions from the first switching state to the second switching state, there is a delay, which is equal to or greater than a predetermined minimum delay. The delay can be greater than 1 second, for example, and preferably greater than 2 seconds, e.g. greater than 5 seconds. The switching from the first switching state to the second switching state thus does not take place abruptly, but instead, the switching from the first switching state to the second switching state takes place in a delayed manner.

During the switching, the retaining force is modified. In particular, the retaining force is continuously reduced during the switching, such that a retaining force corresponding to the second switching state (which can also be zero) is first obtained after the predetermined delay time.

In one embodiment, the control unit is configured to activate the actuator to control the at least one control element such that the retaining force changes in a first time interval by a first amount, and in a subsequent second time interval by a second amount, which is greater than the first amount, during the transition of the control unit from the first switching state to the second switching state. At the start of the transition of the control unit from the first switching state to the second switching state, the retaining force thus only changes to a comparatively small extent. The retaining force thus reduces slowly, while in a subsequent time interval, the retaining force is reduced to a greater extent. At the start of the switching, the retaining force is thus only changed gently. The increase in the reduction in retaining force (the extent thereof) first takes place during the switching procedure, thus reducing the retaining force to a greater extent.

At the end of the switching procedure, a damping of the change in the retaining force can in turn take place. For this, the control mechanism can be configured, for example, to activate the actuator such that in a third time interval, following the second time interval, the retaining force can be changed to a third extent, which is less than the second. At the end of the switching procedure, the retaining force thus changes with a smaller increase thereto (the extent thereof).

The course of the retaining force during the switching can follow a curve (that can be differentiated on a constant basis), which follows the curve of a segment of a sine curve between a maximum and minimum, for example. This results in a gentle transition between the switching states.

The control mechanism can be configured, for example, to activate the actuator in response to a control command for switching the control unit from the first switching state to the second switching state. Such a control command can be detected by the control mechanism, for example, based on the effects of a force acting on a control component that is to be controlled, e.g. a vehicle door, or an acceleration of the control component. The force and/or acceleration applied to the control component can be measured, e.g. by sensors, using appropriate sensors such as (e.g. piezoelectric) force sensors, hall sensors or acceleration sensors.

In one embodiment, the control unit comprises a brake cover, wherein the at least one control element can be moved between different settings in relation to the brake cover, corresponding to a coupling state, a braking state, and a freewheel state.

If the positioning element is pressed against the at least one control element so strongly that the at least one control element is pressed against the brake cover such that it cannot move, the control unit is in the coupling state, in which a relative movement between the brake cover and the control elements is blocked, such that the brake cover remains stationary in relation to the carrier on which the at least one control element is located. Forces can be transferred in this coupling state, e.g. between the gearing components dedicated to the control unit.

In a freewheel state, on the other hand, the at least one control element bears on the brake cover in a non-braking manner. In the freewheel state, the at least one control element is displaced in relation to the brake cover such that the brake cover is not prevented from moving in relation to the at least one control element, and the brake cover can freewheel in relation to the at least one control element.

In a braking state, the at least one control element is pressed by the positioning element against the brake cover, bearing thereon in a braking, abrasive manner, such that the brake cover can move abrasively in relation to the at least one control element, but is slowed down. The positioning element has the shape of a cam, such that the braking effect can be set, based on the position of the positioning element, from a weak braking effect to a strong braking effect, and ultimately to a full stop.

The first switching state can be the coupling state or the braking state, while the second switching state is the freewheel state. In the first switching state, the gearing components dedicated to the control unit are thus functionally connected to one another via the control unit, such that a force flow is obtained between the gearing components, and the gearing components are thus retained in position in relation to one another, such that a control component in the form of a vehicle door can be held in place, for example. In the second switching state, the control component can be moved freely. Forces can no longer flow between the gearing components dedicated to the control unit, such that a vehicle door, for example, can be moved freely.

In one embodiment, the control unit comprises a positioning element, e.g. in the form of a cam for controlling the at least one control element, and a carrier, in relation to which the brake cover can rotate, and on which the positioning element and the at least one control element are disposed for control thereof. The control gearing connects the actuator to the positioning element in order to control the at least one control element. The control gearing of the control unit has a spindle gearing, for example, which has a spindle and a spindle nut screwed thereon, which can move in relation to one another in order to control the at least one control element. The use of a spindle gear for coupling the actuator to the at least one control element enables a transfer of force between the actuator and the at least one control element, with limited play. Large control forces can be transferred with limited travel via the spindle gear. A spindle gear can also be implemented with limited structural space, and operated quietly. Because the spindle nut is threaded onto the spindle, tensions in the system can be reduced.

In order to actuate the spindle, the actuator may drive a driving worm gear, which is in a toothed engagement, for example, with a gear connected to the spindle. The driving worm gear can be located, for example, on a shaft driven by the actuator, and is thus rotated by the actuator. The driving worm gear has a worm thread that engages with the gear teeth, e.g. a helical gearing, such that a rotation of the driving worm gear is translated into a rotation of the gear. The axis of rotation for the driving worm gear and the axis of rotation for the gear are may be perpendicular to one another.

If the control gearing is in the form of a spindle gear, the spindle can be supported such that it can rotate in relation to the carrier. The spindle can be supported at each end, for example, on the carrier, such that the spindle is braced at both ends, and is advantageously retained on the carrier with little axial play. The spindle is functionally connected to the actuator, such that in order to control the positioning element, the spindle is rotated, and the spindle nut can thus be moved axially along the spindle. Because of the threaded engagement, when the spindle is rotated, the spindle nut moves axially along the spindle. By coupling the spindle nut to the positioning element, a control force can be applied to the positioning element.

The positioning element is in the form of a cam in an advantageous embodiment, and is pivotally mounted on the carrier. The positioning element can interact with a pair of control elements, in order to press the control elements against the brake cover, or to disengage them from the brake cover.

In one embodiment, the at least one control element is pivotally mounted on the carrier. This is not necessary, however. It is also conceivable and possible to support the at least one control element in a displaceable manner on the carrier.

A control unit of the type described herein can be used, for example, with a device for manual and/or electric motor changing or maintaining of the position of a first vehicle part in relation to a second vehicle part. Such a device comprises a control component that has a joint such that it can be pivotally mounted on the first vehicle part. The control component is mounted on the first vehicle part such that when the vehicle parts are moved in relation to one another, the positioning element moves in relation to the second vehicle part. An output drive element is mounted on the second vehicle part, which is functionally connected to the control component, and can be driven in order to move the control component in relation to the vehicle part. An electric motor drive mechanism drives the output drive element, and has a drive motor for this, and a gearing that couples the drive motor to the drive element.

The control unit is part of the gearing in this case. The gearing can be switched by the control unit between a coupling state in which the drive motor is coupled to the output drive element, a freewheel state in which the coupling between the drive motor and the output drive element is interrupted such that the output drive element can move independently of the drive motor, and a braking state in which the output drive element can move independently of the drive motor, but is braked. The gearing thus enables an electric motor control of the vehicle parts in relation to one another, as well as manual control thereof. If the vehicle parts are moved in relation to on another by an electric motor, the gearing is brought into its coupling state, such that a coupling is obtained between the drive motor and the output drive element, and the vehicle parts can be moved in relation to one another by the electric motor by driving the output drive element. If the vehicle parts are to be moved manually in relation to one another, the gearing is brought into the freewheel state or the braking state, such that the output drive element is disengaged from the drive motor and can move in the freewheel state (i.e. low friction) but is braked in a defined manner in the braking state. The output drive element can thus be moved independently of the drive motor, enabling a manual movement of the vehicle parts in relation to one another without having to move the drive motor therewith.

The control component may be an arrester strap. The output drive element may be a rotating cable drum, coupled to the control component via a force transferring element in the form of a pull cable that (only) transfers pulling forces. When moving the control component, the cable drum is moved along the control component, and rotates thereby. An electric motor control of two vehicle parts in relation to one another, e.g. in order to control a vehicle door, can take place by driving the cable drum. By disengaging the gearing, the cable drum can be switched to a freewheel state, such that the control component can be controlled manually, independently of a drive device driving the cable drum.

The gearing is switched between the different states by a control unit. In the coupling state, in which the at least one control element is pressed with comparatively high force against the brake cover, the brake cover is secured in relation to the carrier and thus to the housing section of the gearing on which the carrier is located, such that the brake cover, and thus also the gearing element connected to the brake cover cannot be moved in relation to the carrier. The gearing elements are secured in this manner, such that a force flow between the drive element and the output drive element is obtained via the gearing, and the output drive element can be controlled via the drive device, but output forces are blocked, and the output drive element is thus held in place (when the drive mechanism is not supplied with power).

In the braking state, conversely, the at least one control element bears on the brake cover, but still allows movement of the brake cover, subjected to friction, in relation to the at least one control element, such that the gearing element may move as a result of this frictional, braking contact, but is braked thereby. In this braking state, the output drive element can fundamentally thus be moved, independently of the drive mechanism, but is braked thereby.

Lastly, in the freewheel state, the at least one control element is disengaged from the brake cover. This enables the brake cover to move freely in relation to the carrier, such that the force transfer train between the output drive element and the drive device is interrupted, and the output drive element can thus be moved independently of the drive device. It is possible to move the output drive element in the freewheel state easily and with little friction.

It should be noted that in the freewheel state, the at least one control element is not necessarily disengaged entirely from the brake cover. It is also conceivable and possible for the at least one control element to bear on the brake cover with slippage, but exerting a slight braking force thereon when in the freewheel state.

DETAILED DESCRIPTION

An exemplary control unit comprises at least one control element that can be controlled to switch the control unit between different switching states, an actuator, in particular an electric motor actuator, for controlling the at least one control element, and a control mechanism for controlling the actuator. The at least one control element is configured to provide a retaining force between gearing components in a first switching state, and to allow relative movement of the gearing components in a second switching state.

A control unit of this type is described by way of example in DE 10 2015 215 627 A1.

Gearing components can be coupled to one another by a control unit in order to transfer a control force. By disengaging the control unit, the gearing components can be switched to in a freewheel state, such that the one gearing component can be moved independently of the other gearing component, e.g. in order to manually move a vehicle door independently of a drive device.

With a control unit used in a vehicle for changing or maintaining the position of a vehicle door, it may be the case that the vehicle door is to be held open, but that a manual control of the vehicle door is detected as a control command, and a manual control of the vehicle door is to be enabled. In order to retain the vehicle door in an open position, the control unit is in the coupling state or a braking state, for example, in which the control unit couples the dedicated gearing components (braking state), thus producing a force flow via which the vehicle door is held in place. If a control intention by a user is detected, the control unit is switched from the coupling state or braking state to the freewheel state, in which the force flow between the gearing components is interrupted, thus enabling an uninhibited movement of the vehicle door.

It may be desirable with such a control unit to prevent abrupt surges of force. If, for example, a vehicle door is suddenly switched from a retaining state to a freewheel state, the vehicle door may be subjected to high accelerations, resulting in an abrupt change in the position of the vehicle door, causing discomfort to the user, and possibly endangering the user or objects in the movement path of the vehicle door.

Figure 1:
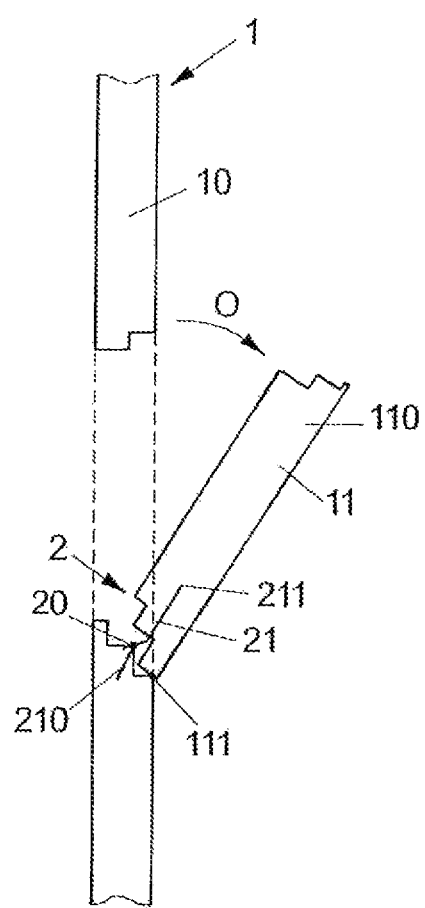
FIG. 1 shows a schematic view of a vehicle door on a vehicle body, with a control component connected in an articulated manner to the vehicle body, that is moved when the vehicle door is pivoted in relation to the vehicle body, in the form of an arrester strap.

FIG. 1 shows a schematic view of a vehicle 1 with a vehicle body 10 and a vehicle door 11 attached in an articulated manner to the vehicle body 10 such that it can pivot over a hinge 111, which can be pivoted in an opening direction θ in relation to the vehicle body 10, in order to open or close the door.

A device 2 acts between the vehicle body 10 and the vehicle door 11, which has a control component 21 in the form of an arrester strap and is used to retain and/or move the vehicle door 11 in relation to the vehicle body 10. The control component 21 in the form of an arrester strap is attached in an articulated manner to the vehicle body 10, e.g. the A-pillar of the vehicle 1, such that it can be pivoted about a joint 20, and moves when the vehicle door 11 is pivoted in relation to the vehicle body 10. The control component 21 extends at one end 211 into an interior space 110 in the vehicle door 11, and moves in this interior space 110 when the vehicle door is moved.

Figure 2:
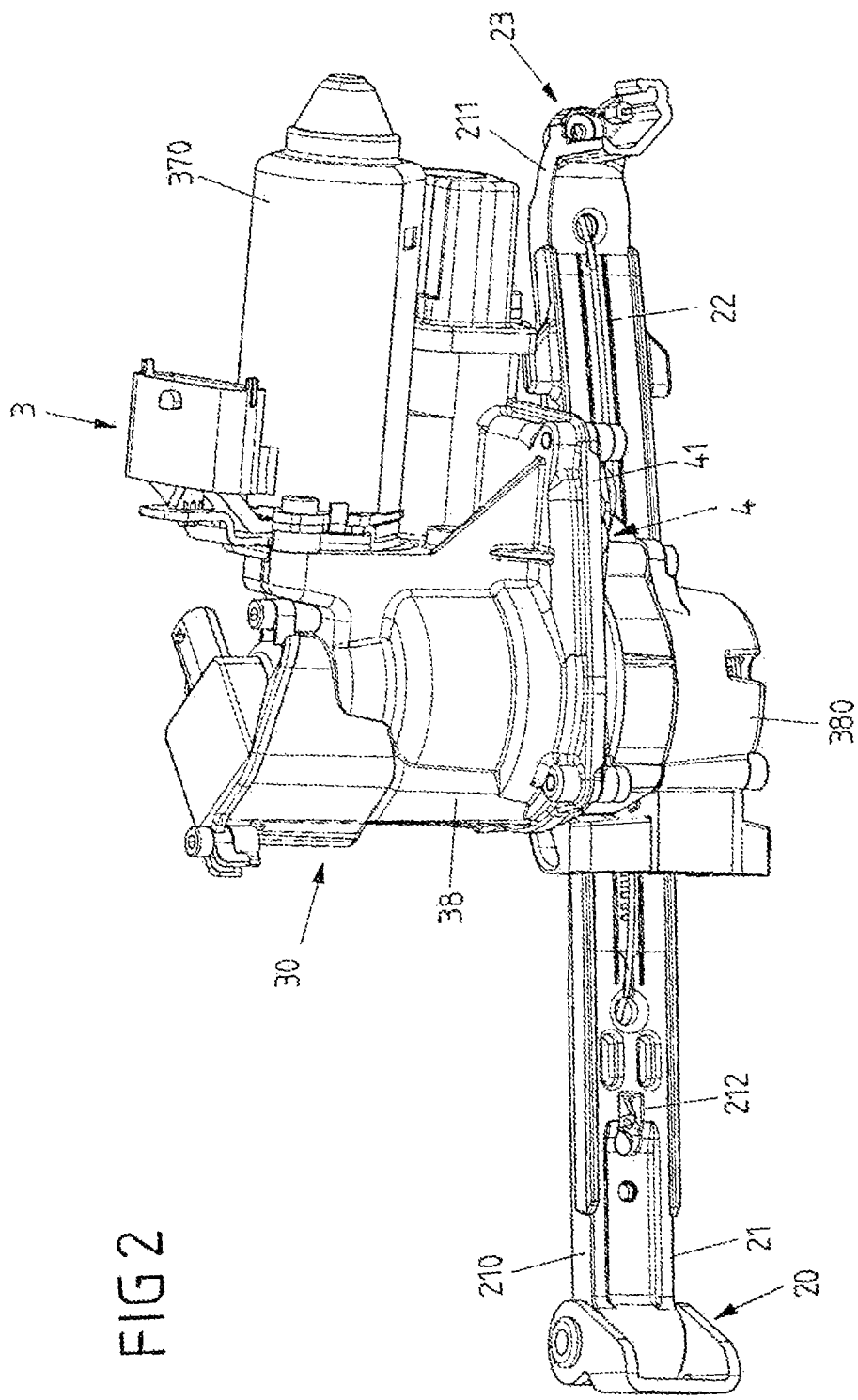
FIG. 2 shows an exemplary embodiment of a device for controlling and securing two vehicle parts in relation to one another.
Figure 3:
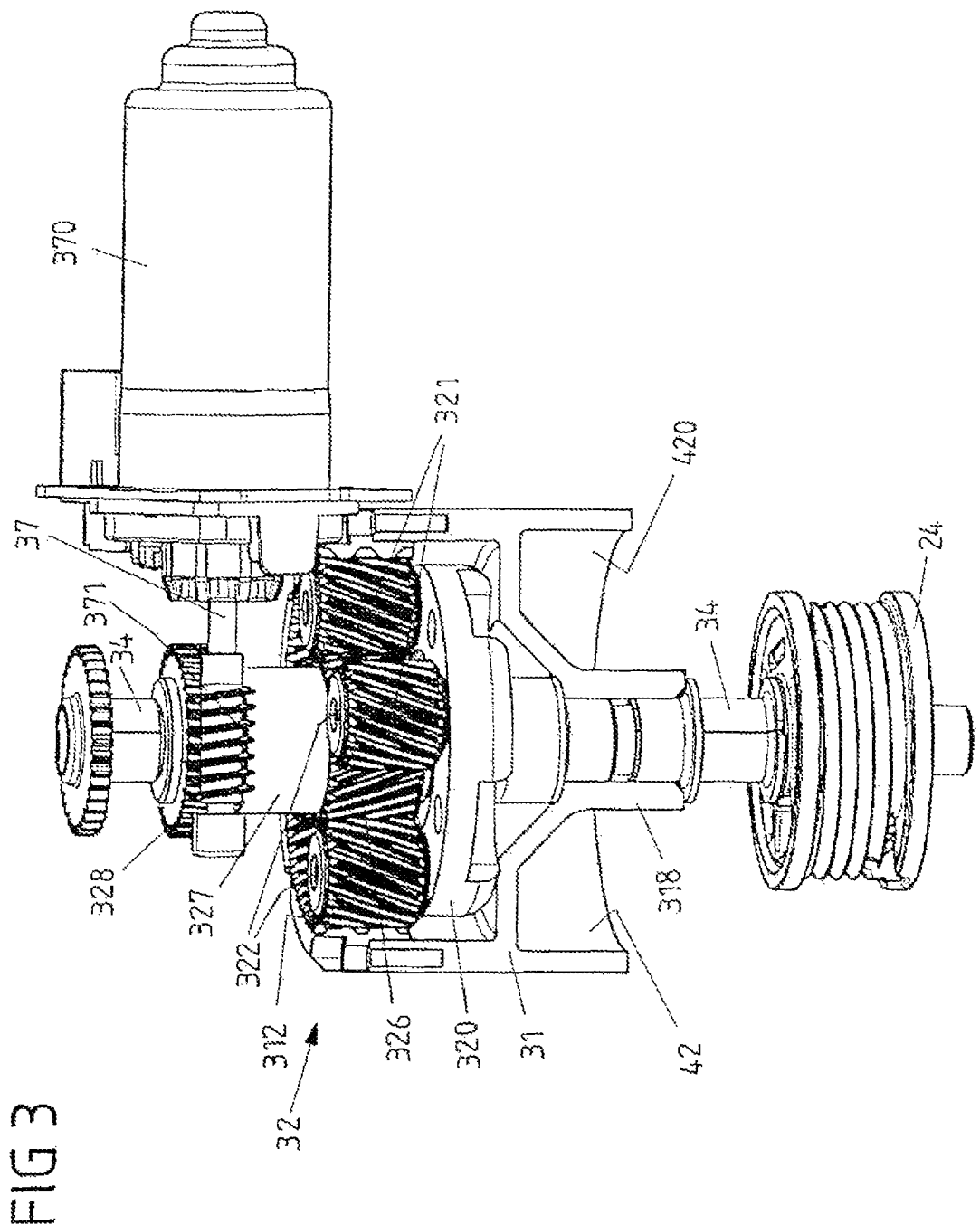
FIG. 3 shows the drive train of the device.
Figure 4:
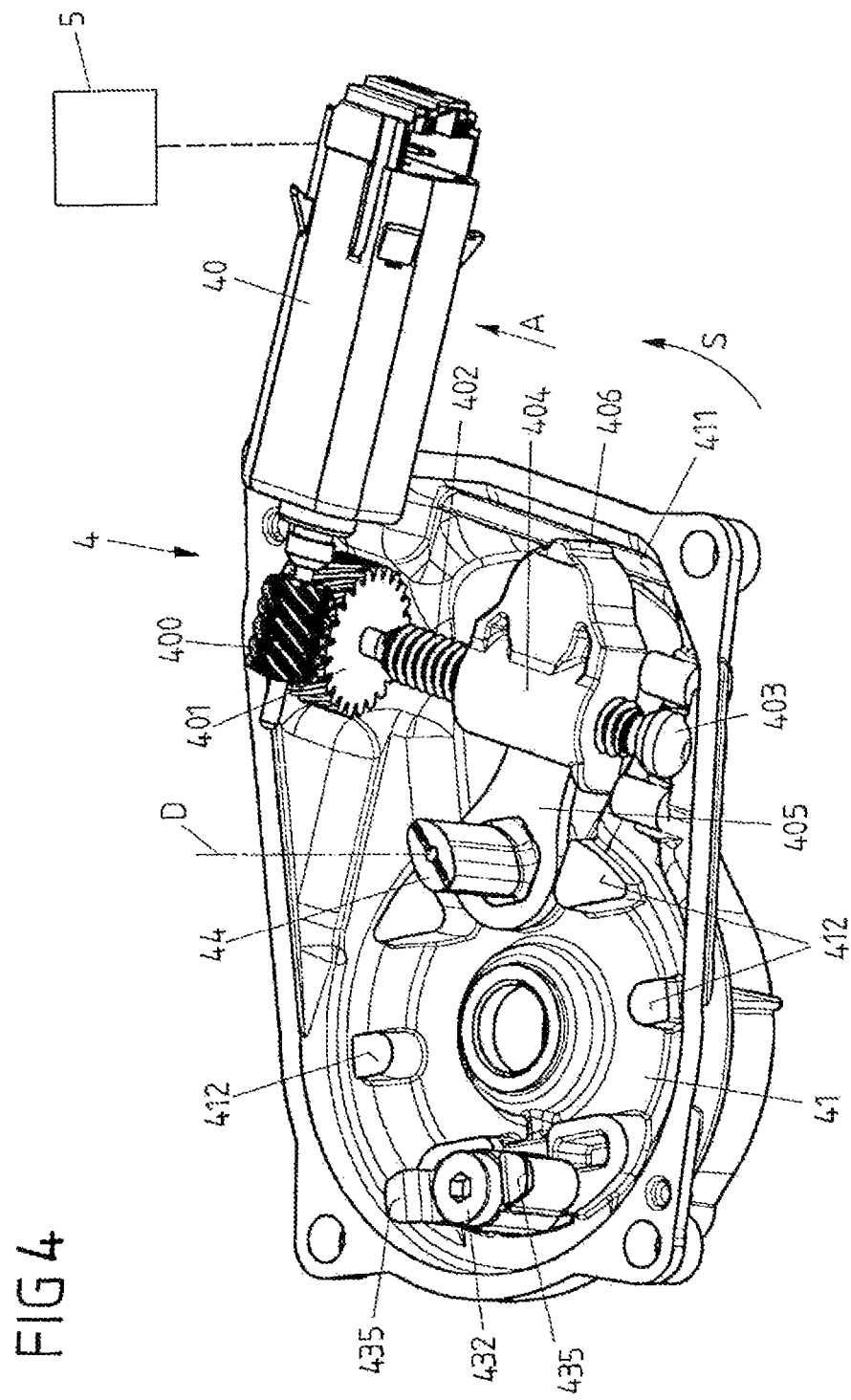
FIG. 4 shows a control unit for controlling a gearing.

Perspective views of an embodiment of the device 2 are shown in FIGS. 2 and 3. The control component 21 in the form of the arrester strap has a joint 20 on one end 210, which can be secured to the vehicle body 10, e.g. the A-pillar of the vehicle 1, in order to connect the control component 21 in an articulated manner to the vehicle body 10.

At the end 210 facing away from the end 211, the control component 21 extends into the interior space 110 of the vehicle door 11. The control component 21 is functionally connected to the vehicle door 11 in order to secure the vehicle door 11 in a position in relation to the vehicle body 10 and/or to allow a electric motor or manual control of the vehicle door 11 in relation to the vehicle body 10.

A force transferring element in the form of a flexible pull cable 22, e.g. a steel or plastic cable, that can transfer a pulling force, is located on the control component 21, via which the control component 21 is connected to an output drive element in the form of a cable drum 24 of a drive mechanism 3. The cable drum 24 is located on a shaft 34 extending along a longitudinal axis L, and can be rotated about the longitudinal axis L. The cable drum 24 has a cable groove encircling the cable drum 24 in the manner of a helical groove, in which segments of the pull cable 22 lie. When the cable drum 24 is rotated about the longitudinal axis L, a segment of the pull cable 220 is wound around the cable drum 24, and another segment of the pull cable 22 is unwound from the cable drum 24. The length that the pull cable 22 extends on the control component 21 does not change thereby. Instead, the rotation of the cable drum 24 results in a movement of the control component 21 along a movement direction in relation to the cable drum 24, such that by driving the cable drum 24, the control component 21, and thus the vehicle parts 10, 11 can be moved toward one another. Alternatively, a braking effect can also be provided via the cable drum 24—when the vehicle parts 10, 11 are moved toward one another—in order to hold the vehicle parts 10, 11 in position in relation to one another, or to brake the movement if the vehicle parts are moved.

The cable drum 24 is connected in a form fitting manner to the shaft 34 for conjoint rotation therewith. The shaft 34 is a component of a gearing 30 in the depicted embodiment, which can act on the cable drum 24 in order to move or secure the vehicle parts. The cable drum 24 is incorporated in a cable drum housing 380, secured to a housing 38 of the device 2. The cable drum housing 380 rotatably supports the cable drum, and guides the cable drum in relation to the control component 21 in a defined manner.

The drive mechanism 3 has a gearing 30, and is configured such that the vehicle door 1 can be moved with an electric motor by a drive mechanism 3, manually independent of the drive mechanism 3, or with the support of the drive device 3 using the electric motor as a servomotor. The gearing 30 may be a planetary gearing as shown in FIG. 3, and has a planetary gear stage 32 with planetary gears 321 that are disposed on a carrier element 320 for conjoint rotation therewith about a rotational axis 322, and that mesh with an inner toothing 312 on a ring gear 31.

The planetary gears 321 are received axially between two carrier elements 320 such that they can rotate (only a lower carrier element is shown in FIG. 3). The carrier for the planet gears is thus formed by two carrier elements 320, between which the planet gears 321 are rotatably disposed.

The planet gears 321 mesh with a sun gear 326 disposed on a hollow shaft 327. The hollow shaft 327 is disposed on the shaft 34 such that it can rotate freely, and forms a spur gear 328 that meshes with a drive worm gear 371 on a motor shaft 37 driven by a drive motor 370. The hollow shaft 327 can be formed as an integral part of a sun gear 326 and the spur gear 328 formed thereon. A multi-component construction is also fundamentally conceivable and possible.

The ring gear 31 forms the inner toothing 312 for engagement with the planetary gears 321. The ring gear 31 is rotatably supported on the shaft 34 by a bearing segment 318 in the form of a bearing bushing, and forms a brake cover 42 at an axial end facing away from the inner toothing 312, in which control elements 430, 431 of a control unit 4 are located, which—driven by an actuator 40—can be moved between different states.

Figure 5A:
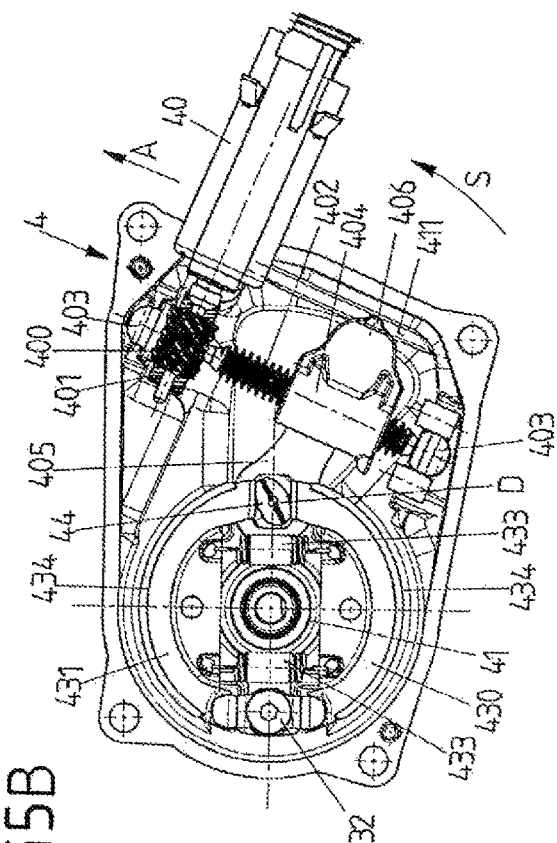
FIG. 5A shows the control unit in a freewheel state.
Figure 5B:
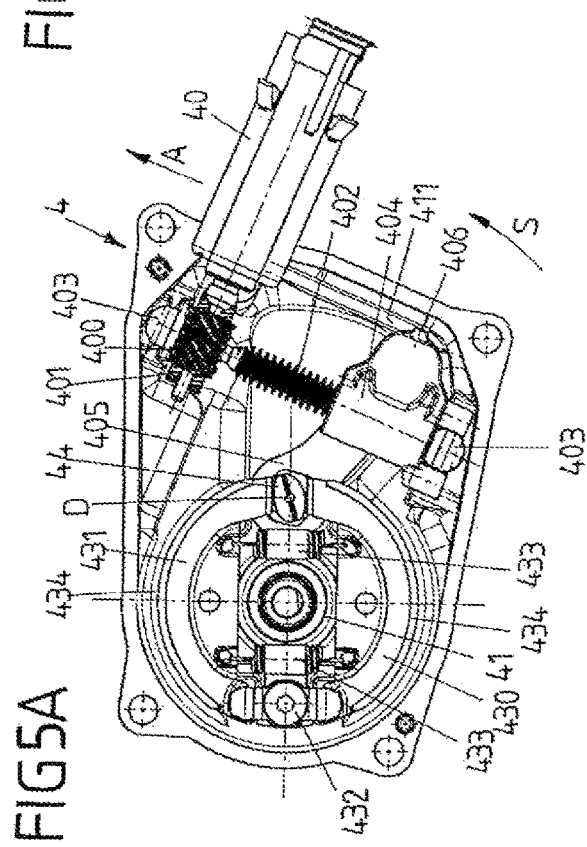
FIG. 5B shows the control unit in a braking state.
Figure 5C:
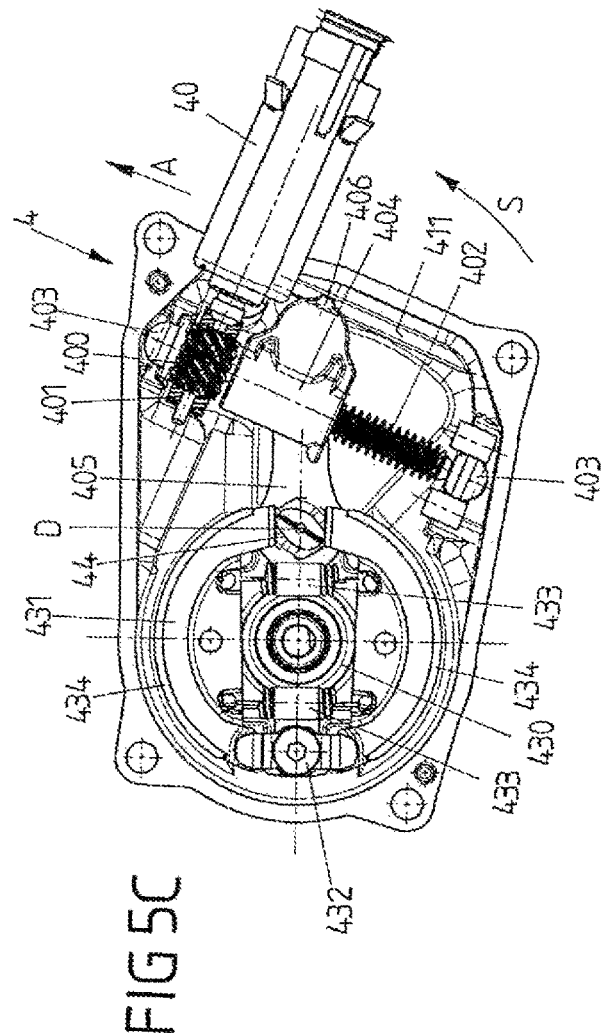
FIG. 5C shows the control unit in a coupling state.

The control unit 4 shown in an embodiment in FIGS. 4 to 7 is in the form of a drum brake, and is shown in different functional states in FIGS. 5A to 5C. The control elements 430, 431 in the form of brake shoes with brake pads 434 disposed thereon are located on a carrier 41 formed by a housing component, which is attached in a stationary manner to the housing 38. The brake shoes 430, 431 are pivotally mounted about a fixed bearing 432 (see FIGS. 4 and 5A-5C) on the carrier 41, and can be controlled for switching the gearing 30 between different settings.

A positioning element 44 in the form of a cam controls the control elements 430, 431 in the form of brake shoes, which is pivotally mounted on the carrier 41, and is connected to a lever 405, and can be moved by a control gearing in the form of a spindle gearing. The control gearing in the form of a spindle gearing has a spindle 402 and a spindle nut 404 threaded thereon, which can move in relation to one another. The spindle 402 is rotatably mounted at its axial ends on the carrier 41 by a spherical ball bearing 403, which is a component of the housing 38 for the drive mechanism 3, and has a gear 401 on one end dedicated to an actuator 40 in the form of an electric motor, which is designed as a worm gear with a circumferential helical gearing, and is engaged with a drive worm gear 400 secured to a drive shaft of the actuator 40 for conjoint rotation therewith.

The spindle nut 404 is guided via a guide segment 406 along a direction of movement A toward the carrier 41, and lies in a guide track 411 on the carrier 41 such that it can slide therein. A second guide track can be formed on a half of a housing, not shown in FIGS. 4 and 5A-5C, that is placed on the carrier 41, such that the spindle nut 404 is secured in its rotational position in relation to the carrier 41, but is guided in a sliding manner along the direction of movement A.

Figure 7:
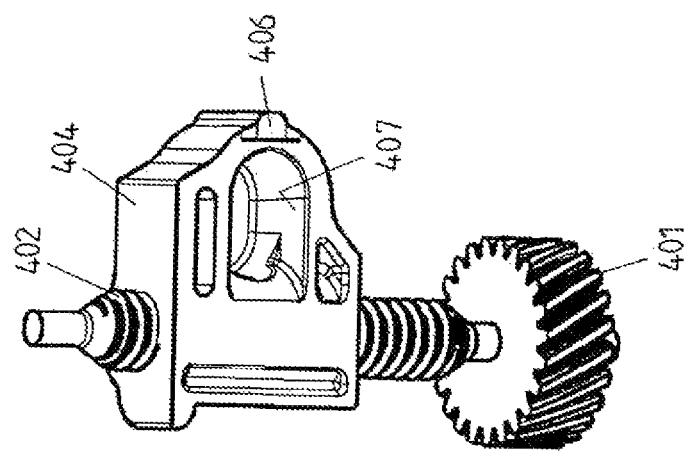
FIG. 7 shows a separate view of a spindle gearing for the control unit, which has a spindle that can be driven by an actuator, and a spindle nut threaded on the spindle.
Figure 6:
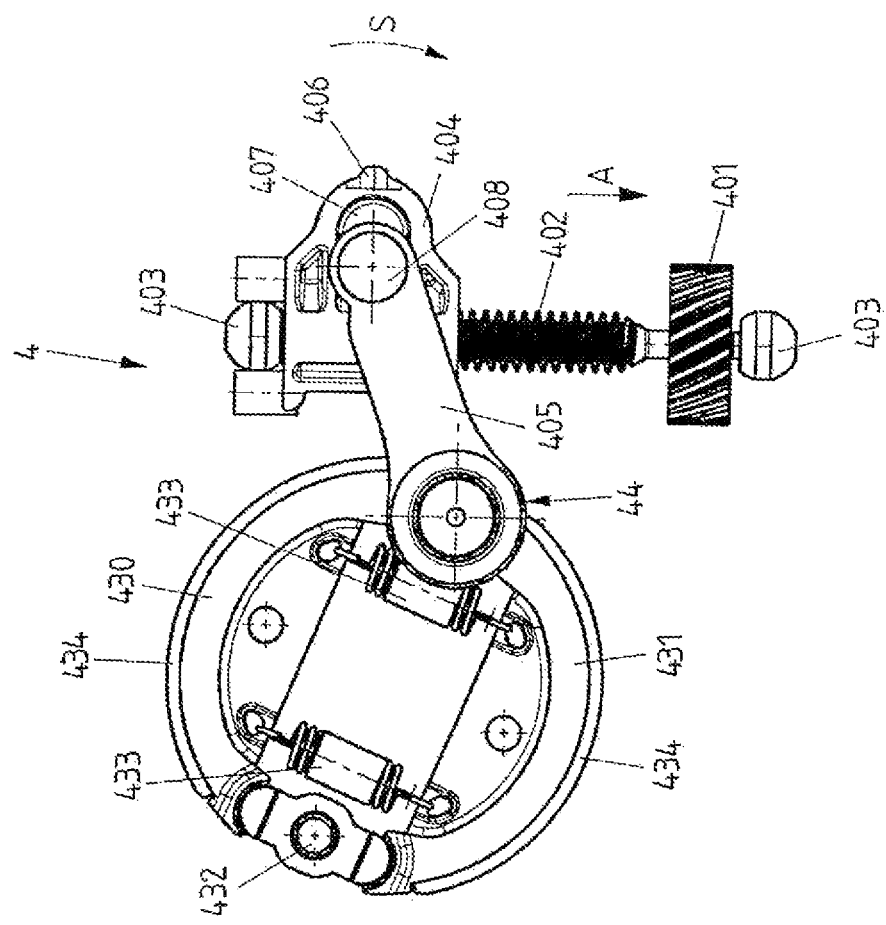
FIG. 6 shows the control unit from below, without the carrier element.

The spindle nut 404 is coupled to a lever 405, on which the positioning element 44 is rigidly disposed. As can be seen in FIGS. 6 and 7, the spindle nut 404 has a coupling mechanism in the form of an elongated hole 407 for coupling with the lever 405, in which a coupling element in the form of a pin 408 on the lever 405 engages such that when the spindle nut 404 moves longitudinally along the spindle 402, a change in the position of the pin 408 in relation to the spindle nut 404 can be compensated for.

In order to control the control elements 430, 431, the actuator 40 drives the drive worm gear 400, which in turn rotates the gear 401 and thus the spindle 402. As a result, the spindle nut 404—because it meshes with the spindle 402—is moved longitudinally along the direction of movement A in relation to the spindle 402, and the lever 405 that can pivot about the pivot axis D of the positioning element 44 is moved in the positioning direction S, and the positioning element 44 is thus also pivoted about the pivot axis D.

The gearing 30 can be switched between a coupling state, a braking state, and a freewheel state via the switching mechanism 4. In the freewheel state, FIG. 5A, the brake shoes 430, 431 are in the freewheel state, and removed (slightly) from the brake cover 42, such that the brake cover 42 is not secured in relation to the housing 38, and no (noticeable) braking effects are caused by the brake shoes 430, 431. In this freewheel state, the cable drum 24 can fundamentally be moved independently of the drive motor 370, without moving the drive motor 370 when the cable drum 24 is moved by the output drive. In this freewheel state, it is possible to easily move the vehicle door 11 manually, independently of the drive motor 370.

The switching mechanism 4 can be switched from the freewheel state, in that by rotating the spindle 402 in the appropriate direction, the spindle nut 404 is moved, and the positioning element 44 is pivoted in order to spread apart the control elements 430, 431 in relation to one another, as can be seen in FIG. 5B. In a braking state, the brake shoes 430, 431 are pressed with less force—in comparison with the coupling state—against the inside of the brake cover 42, such that the ring gear 31 is not stopped, but (only) braked in a defined manner. The ring gear 31 can thus rotate in relation to the carrier 41, but is braked by the frictional bearing of the brake shoes 430, 431 on the brake cover 42.

The movement of the vehicle parts 10, 11 in relation to one another can be braked with such a braking effect, e.g. when approaching an end position, e.g. the maximum opened position, during a manual movement of the vehicle door 11. A movement that is too quick, e.g. in the case of manually slamming the vehicle door 11, can also be slowed via a defined braking.

In the braking state, the control elements 430, 431 bear on the inner surface of a dedicated brake surface 420 of the brake cover 42 (see FIG. 3) in an abrasive and therefore braking manner, such that a braking effect is obtained. When the spindle nut 404 is moved further in the direction of movement A, the positioning element 44 is rotated further about its pivot axis D, as shown in FIG. 5C, such that the control elements 430, 431 are pressed against the brake cover 42, and secured in a force fitting manner to the brake cover 42. The control unit 4 thus ends up in the coupling state, in which the brake cover 42 is held in a stationary position in relation to the carrier 41.

In the coupling state (FIG. 5C), the brake cover 42 cannot move in relation to the housing 38 due to the stopping effect of the brake shoes 430, 431, such that the ring gear 31 is held in position in relation to the housing 38. A force flow is produced in this coupling state between the hollow shaft 327 and the cable drum 24, such that the drive motor 370 is coupled to the cable drum 24 via the gearing 30, and the cable drum 24 can be moved with an electric motor, or the cable drum 24 is held in position due to the self-inhibiting of the gearing 30 (when the drive motor 370 is not activated).

As can be seen in FIGS. 5A to 5C, the brake shoes 430, 431 are pretensioned toward their freewheel setting (FIG. 5C) via tensioning elements 433 in the form of tension springs. To move the brake shoes 430 431 from the freewheel setting, the positioning element 44 pushes the brake shoes 430, 431 apart, and thus toward the brake cover 42. This takes place counter to the effect of the tensioning elements 433. In order to return the brake shoes 430, 431 toward the freewheel setting, the positioning element 44 is pivoted back, the brake shoes 430, 431 follow the positioning element 44 due to the effects of the tensioning elements 433, and thus move back toward the freewheel setting.

The control unit 4 is used for switching the device between the different states described herein. If the vehicle door 11 is to be moved by an electric motor, the control unit 4 switches to the coupling state, such that there is a force flow between the drive motor 370 and the cable drum 24, such that moving forces between the vehicle door 11 and the vehicle body 10 can act to move the vehicle door 11 between its closed position and its open position.

If instead, the vehicle door 11 is to be held in position, the control unit 4 is switched to the braking state, for example, in order to hold the vehicle door 11 in place. The vehicle door 11 is thus held in position by with a predetermined retaining force (braking) via the drive mechanism 3 and the force flow through the control unit 4.

If a user desires to move the vehicle door 11 manually, and grabs the vehicle door 11 for this, this intention on the part of the user can be detected, e.g., via appropriate sensors, e.g. movement sensors or acceleration sensors on the vehicle door 11. In particular, the control mechanism 5 (see FIG. 4) can be configured to evaluate sensor signals in order to conclude that a user intends to move the door based on an acceleration of the vehicle door 11 or based on a change in the movement speed, or based on a force applied to the vehicle door 11.

If such an intention has been detected, the control unit 4 is switched to its freewheel state, such that the vehicle door 11 can freely be moved manually.

In order to prevent an abrupt switching from the braking state to the freewheel state, and thus an abrupt initiation of movement of the vehicle door 11, the control mechanism 5 controls the control unit 4 such that the switching from the one first switching state, corresponding to the braking state, to the second switching state, corresponding to the freewheel state, takes place in a delayed manner.

Figure 8A:
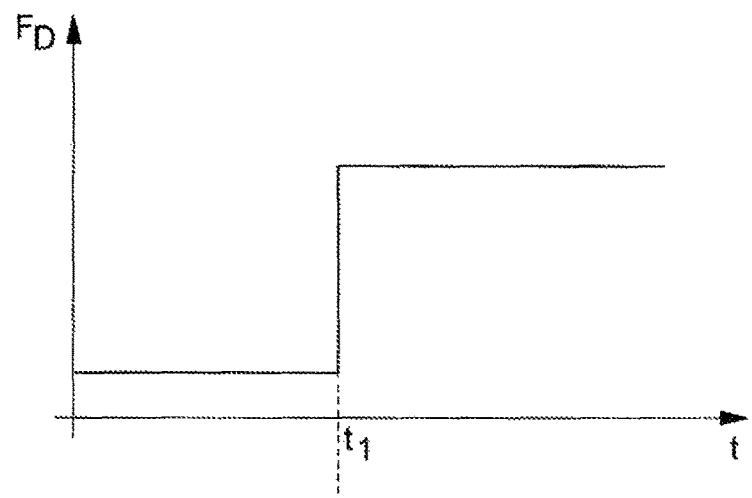
FIG. 8A shows a graph of the curve of a force applied to a control component, corresponding to a manual control by a user.
Figure 8B:
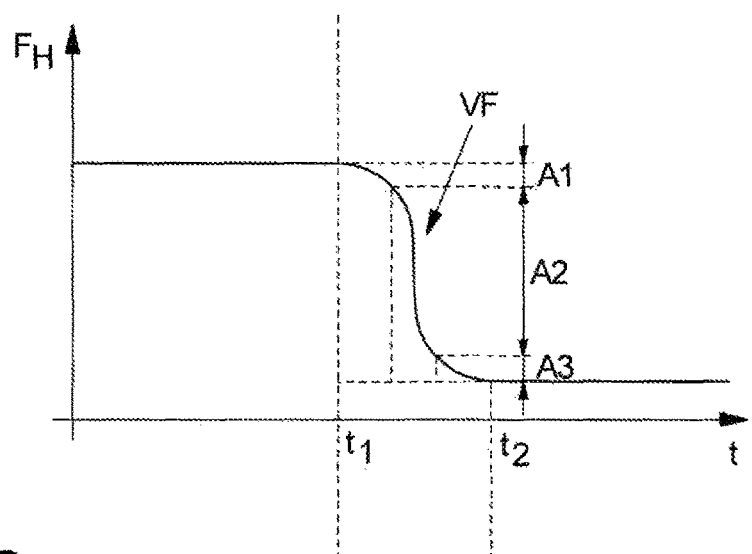
FIG. 8B shows a graph of a retaining force applied to the control component.
Figure 8C:
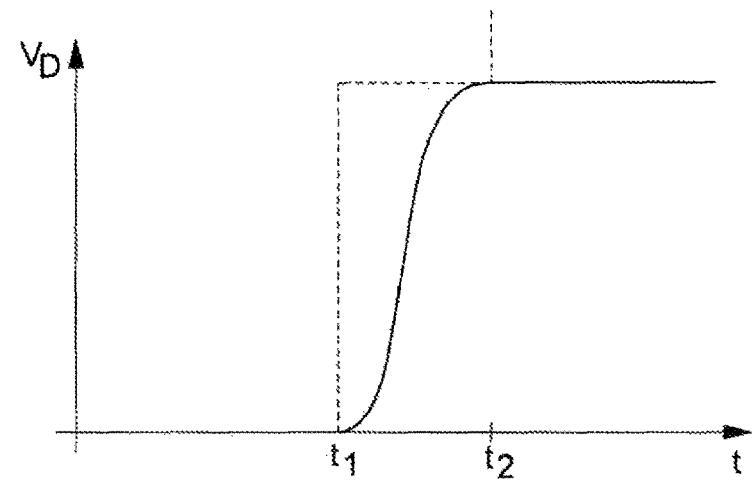
FIG. 8C shows a graph of the curve of the speed of the control component.

This is plotted on a graph in FIGS. 8A to 8C. Thus, with a manual movement by a user, a force FD is applied to the vehicle door 11, which changes abruptly (nearly instantly) at a point in time t1, as is shown in FIG. 8A. If such a force to the vehicle door 11 is detected—e.g. based on a measurement of the force applied to the vehicle door 11, or a measurement of the acceleration of the vehicle door 11—then the control mechanism 5 activates the actuator 40 of the control unit 4 such that the retaining force FH of the control elements 430, 431 is changed on the basis of a delay function VF that changes in a continuous manner, as shown in FIG. 8B. The retaining force FH provided by the control unit 4 thus does not change abruptly when transitioning from the braking state to the freewheel state, but instead in a controlled, delayed manner, based on the given delay function VF.

The delay function VF provides for a smooth, continuous, constantly differential change in the retaining force FH, such that at the start of the switching procedure, the retaining force FH changes only a small amount A1 in a first time interval T1, but by a greater amount A2 in a subsequent second time interval T2 (which is the same length as the first time interval T1), and at the end of the switching procedure, the retaining force FH again changes only by a small amount A3 in a third time interval T3 (which is the same length as the first time interval T1 and the second time interval T2). The changes in the retaining force FH thus take place at the start and the finish of the switching procedure with a small increase (in the amount), such that the switching is damped at the start and finish.

Accordingly, the movement speed VD of the vehicle door 11 is damped, as shown in FIG. 8C. The movement speed VD of the vehicle door 11 does not change abruptly at the time t1, in particular, when the desire to move the door has been detected, but instead, changes continuously in a constantly increasing manner between the first time t1 and a second time t2.

The switching procedure is thus delayed as a result of the delay function VF. In particular, this can result in a delay of more than 1 second, preferably more than 2 seconds, or even more than 5 seconds.

The delay is measured as the time between the start of the switching procedure from the first switching state (time t1) until reaching the second switching state (time 2).

Figure 9A:
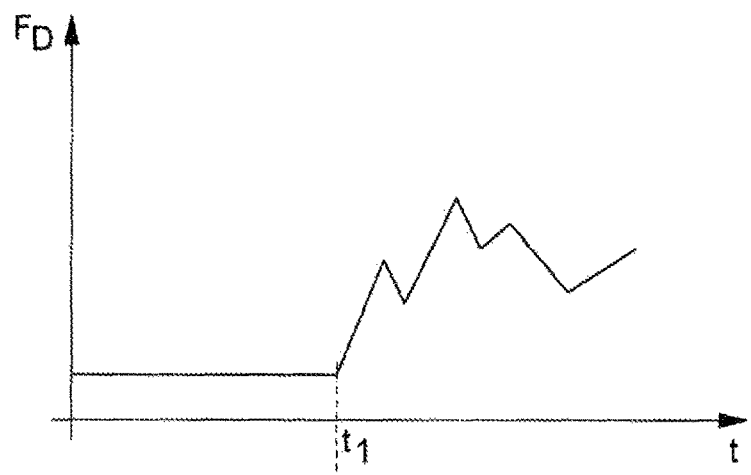
FIG. 9A shows a graph of the curve of a force applied to a control component, e.g. due to wind striking the control component.
Figure 9B:
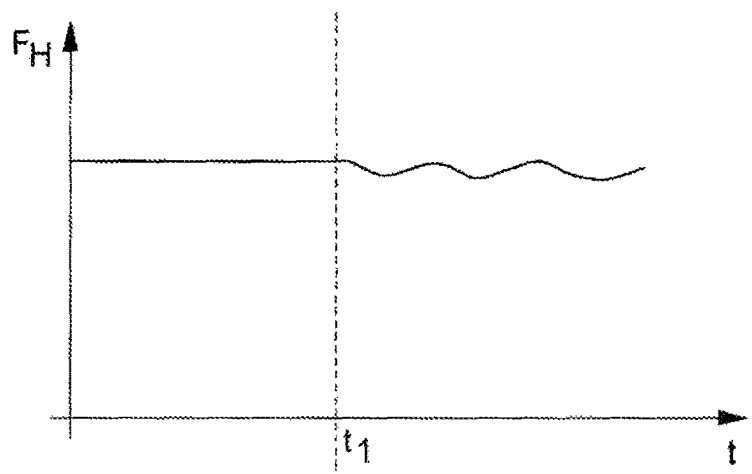
FIG. 9B shows a graph of a retaining force applied to the control component.
Figure 9C:
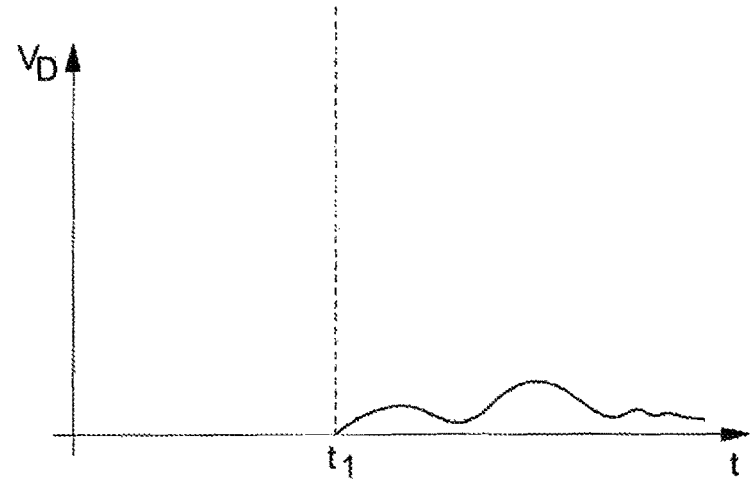
FIG. 9C shows a graph of a resulting speed of the control component.

It is also possible to vary the retaining force FH when a force is applied to the vehicle door 11, e.g. a gust of wind, such that the vehicle door 11 is held reliably in an open position, even when subjected to strong winds, as shown in FIGS. 9A to 9C. As a result—when it has been determined that the door is being subjected to a strong wind FD, as shown in FIG. 9A—the retaining force FH can be adjusted to the wind force FD (FIG. 9B), in order to dampen a movement (VD in FIG. 9C) as much as possible, and in particular to prevent an uncontrolled movement of the vehicle door 11, e.g. a slamming thereof.

The fundamental concept of the invention is not limited to the exemplary embodiments given above, and instead can be implemented in fundamentally entirely different ways.

A control unit of the type described herein can be used with entirely different devices. In this regard, the use on a device for changing or maintaining the position of a vehicle door is to be understood to be merely exemplary. A control unit of the type described herein can theoretically be used for functionally connecting any gearing components.

LIST OF REFERENCE SYMBOLS 1 vehicle
2 body
11 vehicle door
110 door interior
111 door hinge
2 device
20 joint
21 control component (arrester strap)
210, 211 end
22 flexible force transferring element (pull cable)
24 cable drum
3 drive mechanism
30 gearing
31 ring gear
312 inner toothing
318 bearing segment
32 planetary gear stage
320 carrier element
321 planet gears
322 rotational axis
326 sun gear
327 hollow shaft
328 spur gear
34 shaft
37 motor shaft
370 drive motor
371 drive worm gear
38 housing
380 cable drum housing
4 switching mechanism
40 actuator
400 drive worm gear
401 gear
402 gearing element (spindle)
403 ball bearing
404 gearing element (spindle nut)
405 lever
406 guide segment
407 coupling mechanism
408 coupling element
409 motor shaft
41 carrier
411 guide track
42 brake cover
420 brake surface
430, 431 control elements (brake shoes)
432 fixed bearing
433 tension spring
434 brake pad
44 positioning element
5 control mechanism
A direction of movement
A1, A2, A3 amount
D pivot axis
FD force applied to vehicle door
FH retaining force
K calibration distance
L longitudinal axis
O opening direction
S positioning direction
T1, T2, T3 time intervals
V movement direction
VD movement speed
VF delay function
X opening direction
X1-X3 location

What is claimed is:

1. A control unit for establishing a functional connection between two gearing components comprising:
at least one control element configured to switch the control unit between different switching states, wherein the at least one control element is configured to provide a retaining force between a first gearing component and a second gearing component in a first switching state, and to allow a relative movement of the first gearing component and the second gearing component in a second switching state;
an actuator configured to move the at least one control element; and
a control mechanism configured to control the actuator, wherein the control mechanism is configured to activate the actuator to switch the control unit from the first switching state to the second switching state in order to move the at least one control element to reduce the retaining force based on a predetermined delay function;
wherein the delay function causes a delay in transitioning the control unit from the first switching state to the second switching state, wherein the delay is equal to a predetermined delay time;
wherein the control mechanism is configured to activate the actuator to move the at least one control element such that the retaining force during the transition of the control unit from the first switching state to the second switching state changes in a first time interval by a first amount and in a subsequent, second time interval equal in length to said first time interval by a second amount that is greater than the first amount.

2. The control unit according to claim 1, wherein the delay is greater than 1 second.

3. The control unit according to claim 1, wherein the control mechanism is configured to activate the actuator to move the at least one control element such that the retaining force during the transition of the control unit from the first switching state to the second switching state changes in a third time interval following the second time interval by a third amount that is less than the second amount.

4. The control unit according to claim 1, wherein the control mechanism is configured to activate the actuator in response to a command for switching the control unit from the first switching state to the second switching state.

5. The control unit according to claim 1, wherein the control unit includes a brake cover and at least one control element, wherein the control element bears in a fixed manner on the brake cover in a coupling state, bears on the brake cover in a non-braking manner in a freewheel state, and is pressed against the brake cover in a braking manner by the positioning element in a braking state.

6. The control unit according to claim 5, wherein the first switching state corresponds to the coupling state or the braking state, and the second switching state corresponds to the freewheel state.

7. The control unit according to claim 6, wherein the control unit further includes a positioning element and a carrier element, the positioning element being configured to move the at least one control element, wherein the brake cover is rotatable with respect to the carrier element and wherein the positioning element and the at least one control element are moveably disposed on the carrier element, wherein a control gearing connects the actuator to the positioning element to move the at least one control element.

8. The control unit according to claim 7, wherein the control gearing has a spindle gearing.

9. A device for changing or maintaining the position of a first vehicle part in relation to a second vehicle part, the device comprising:
a control component including a joint configured to be pivotally disposed on the first vehicle part, wherein the control component is to be placed on the first vehicle part such that when the vehicle parts are moved in relation to one another, the control component moves in relation to the second vehicle part;
an output drive element placed on the second vehicle part, functionally connected to the control component, and configured be driven to move the control component in relation to the second vehicle part; and
an electric motor drive mechanism configured to drive the output drive element, wherein the drive mechanism has a drive motor and a gearing that couples the drive motor to the output drive element,
wherein the gearing comprises a control unit including:
at least one control element configured to switch the control unit between different switching states, wherein the at least one control element is configured to provide a retaining force between a first gearing component and a second gearing component in a first switching state, and to allow a relative movement of the first gearing component and the second gearing component in a second switching state;
an actuator configured to move the at least one control element; and
a control mechanism configured to control the actuator, wherein the control mechanism is configured to activate the actuator to switch the control unit from the first switching state to the second switching state in order to move the at least one control element to reduce the retaining force based on a predetermined delay function;
wherein the delay function causes a delay in transitioning the control unit from the first switching state to the second switching state, wherein the delay is equal to a predetermined delay time;
wherein the control mechanism is configured to activate the actuator to move the at least one control element such that the retaining force during the transition of the control unit from the first switching state to the second switching state changes in a first time interval by a first amount and in a subsequent, second time interval equal in length to said first time interval by a second amount that is greater than the first amount,
wherein the control unit is configured to switch the gearing between
a coupling state, the drive motor being coupled to the output drive element in the coupling state,
a freewheel state, the drive motor and the output drive element being not coupled to one another in the freewheel state such that the drive element is moveable independent of the drive motor, and
a braking state, the output drive element being moveable independent of the drive motor in the braking state, but being braked.

10. A device for operating a first vehicle part relative to a second vehicle part, the device comprising:
a control component connectable between first and second vehicle parts and actuatable to move the first and second vehicle parts relative to each other;
a drive mechanism including a motor and gearing operably coupling the motor to the control component; and
a control unit including:
at least one control element configured to switch the control unit between different switching states, wherein the at least one control element is configured to provide a retaining force between a first gearing component and a second gearing component in a first switching state, and to allow a relative movement of the first gearing component and the second gearing component in a second switching state;
an actuator configured to move the at least one control element; and
a control mechanism configured to control the actuator, wherein the control mechanism is configured to activate the actuator to switch the control unit from the first switching state to the second switching state in order to move the at least one control element to reduce the retaining force based on a predetermined delay function;
wherein the delay function causes a delay in transitioning the control unit from the first switching state to the second switching state, wherein the delay is equal to a predetermined delay time;
wherein the control mechanism is configured to activate the actuator to move the at least one control element such that the retaining force during the transition of the control unit from the first switching state to the second switching state changes in a first time interval by a first amount and in a subsequent, second time interval equal in length to said first time interval by a second amount that is greater than the first amount,
wherein the control unit is configured to selectively establish a force flow through the gearing so that the motor can power the control component, the control unit including a first component rotationally fixed to the gearing and at least one control element configured to selectively brake the first component, wherein the control unit includes (i) a freewheel state, the control element being disengaged from the first component in the freewheel state so that the control component moves independently of the motor, (ii) a coupling state, the control element being rotationally locked with the first component in the coupling state so that the control component moves dependently with the motor, and (iii) a braking state, the control element being frictionally engaged in a slippable condition with the first component so that the control component moves independently of the motor when a force on one of the first and second parts exceeds a threshold and moves dependently with the actuator when a force on the one of the first and second parts is less than the threshold.

11. The device according to claim 10, wherein the control unit further includes an actuator that moves the at least one control element relative to the first component to switch between the freewheel state, the coupling state, and the braking state.

12. The device according to claim 11 further comprising a control mechanism configured to activate the actuator to switch the control unit from the coupling state to the braking state in response to a force being applied to one of the first and second parts.

13. The device according to claim 11 further, wherein the control unit switches from the coupling state to the braking state according to a predetermined delay function.

14. The device according to claim 13, wherein the delay is greater than 1 second.

15. The device according to claim 10 further comprising a control mechanism configured to, in response to a request to switch from the coupling state to the braking state or the freewheel state, activate the actuator to move the at least one control element such that a friction force between the control element and the first component is reduced by a first amount during a first time interval and, subsequently, by a second amount during a second time interval.

16. The device according to claim 15, wherein the second amount is greater than the first amount.

17. The device according to claim 10, wherein the first component is brake cover and the least one control element is a brake shoe, wherein the actuator is operably coupled to the brake shoe to increase and decrease a force between the brake cover and the at least one brake shoe.

18. The device according to claim 17, wherein the gearing includes a planetary gear stage having a ring gear fixed to the brake cover, wherein the gearing establishes a force flow between the motor and the control component when in the coupling state and when in the braking state.

* * * * *